(12) United States Patent
Kennedy et al.

(10) Patent No.: US 11,727,916 B2
(45) Date of Patent: Aug. 15, 2023

(54) AUTOMATED SOCIAL AGENT INTERACTION QUALITY MONITORING AND IMPROVEMENT

(71) Applicant: Disney Enterprises, Inc., Burbank, CA (US)

(72) Inventors: James R. Kennedy, Glendale, CA (US); Raymond J. Scanlon, Burbank, CA (US); Komath Naveen Kumar, Los Angeles, CA (US); Douglas A. Fidaleo, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 111 days.

(21) Appl. No.: 17/325,676

(22) Filed: May 20, 2021

(65) Prior Publication Data

US 2022/0375454 A1    Nov. 24, 2022

(51) Int. Cl.
  *G10L 15/01*     (2013.01)
  *G10L 15/18*     (2013.01)
  *G10L 15/26*     (2006.01)
  *G01S 13/86*     (2006.01)
  *G06F 3/01*      (2006.01)
  *G06V 40/16*     (2022.01)

(52) U.S. Cl.
  CPC ............ *G10L 15/01* (2013.01); *G01S 13/865* (2013.01); *G01S 13/867* (2013.01); *G10L 15/1807* (2013.01); *G10L 15/26* (2013.01); *G06F 3/013* (2013.01); *G06F 3/017* (2013.01); *G06V 40/176* (2022.01)

(58) Field of Classification Search
  CPC ..... G10L 15/01; G10L 15/1807; G10L 15/26; G06V 40/176; G06F 3/013; G06F 3/017
  USPC ......................................................... 704/235
  See application file for complete search history.

(56) References Cited

U.S. PATENT DOCUMENTS

2011/0010173 A1* 1/2011 Scott ...................... G10L 21/10
                                                                704/235
2014/0314225 A1* 10/2014 Riahi ...................... H04L 51/02
                                                                379/265.09

OTHER PUBLICATIONS

A. Benso, A. Cilardo, N. Mazzocca, L. Miclea, P. Prinetto and E. Szilard, "Reconfigurable systems self-healing using mobile hardware agents," IEEE International Conference on Test, 2005., Austin, TX, USA, 2005, p. 9-p. 476, doi: 10.1109/TEST.2005.1584007. (Year: 2005).*

(Continued)

*Primary Examiner* — Bharatkumar S Shah
(74) *Attorney, Agent, or Firm* — Farjami & Farjami LLP

(57) ABSTRACT

A system for monitoring and improving social agent interaction quality includes a computing platform having processing hardware and a system memory storing a software code. The processing hardware is configured to execute the software code to receive, from a social agent, interaction data describing an interaction of the social agent with a user, and to perform an assessment of the interaction, using the interaction data, as one of successful or including a flaw. When the assessment indicates that the interaction includes the flaw, the processing hardware is further configured to execute the software code to identify an interaction strategy for correcting the flaw, and to deliver, to the social agent, one or both of the assessment and the interaction strategy to correct the flaw in the interaction.

20 Claims, 5 Drawing Sheets

(56) References Cited

OTHER PUBLICATIONS

Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, Quoc V. Le. Towards a Human-like Open-Domain Chatbot. Google Research, Brain Team. pp. 1-38.

Stephen Roller, Emily Dinan, Naman Goyal, Da Ju, Mary Williamson, Yinhan Liu, Jing Xu, Myle Ott, Kurt Shuster, Eric M. Smith, Y-Lan Boureau, Jason Weston. Recipes for building an open-domain chatbot. Facebook AI Research. pp. 1-25.

Conversation analysis. Wikipedia. pp. 1-8.

Severin Lemaignan, Fernando Garcia, Alexis Jacq, Pierre Dillenbourg. From Real-time Attention Assessment to "With-me-ness" in Human-Robot Interaction. Computer-Human Interaction in Learning and Instruction Laboratory (CHILI) Ecole Polytechnique Federale de Lausanne (EPFL). Lausanne, Switzerland. pp. 1-8.

Santosh Kumar. Automated Assessment of Naturally Occurring Conversations. Computer Science, University of Memphis. Apr. 12, 2012. pp. 1-19.

M. O. Meira, A. M. P. Canuto. Evaluation of Emotional Agents' Architectures: an Approach Based on Quality Metrics and the Influence of Emotions on Users. Proceedings of the World Congress on Engineering 2015 vol. I. WCE 2015, Jul. 1-3, 2015, London, U.K. pp. 143-150.

* cited by examiner

AUTOMATED SOCIAL AGENT INTERACTION QUALITY MONITORING AND IMPROVEMENT

BACKGROUND

Advances in artificial intelligence have led to the development of a variety of devices providing dialogue-based interfaces that simulate social agents. However, one typical shortcoming of conventional social agents is their inability to engage in natural, fluid conversations, or to engage with more than one person at a time. Moreover, although existing social agents offer some degree of user personalization, for example tailoring responses to an individual user's characteristics or preferences, that personalization remains limited by their fundamentally transactional design. That is to say, their transactional functionality makes it unnecessary for conventional social agents to remember more than a limited set of predefined keywords, such as user names and basic user preferences. Moreover, conventional social agents are typically unable to recover from conversational breakdowns, and instead tend to terminate the interaction with a predetermined phrase such as: "I'm having trouble understanding right now." Thus, there is a need in the art for an automated solution for monitoring and improving the interaction quality of a social agent so as to enable interactions with multiple users concurrently in a natural and engaging manner.

DETAILED DESCRIPTION

Figure 1:
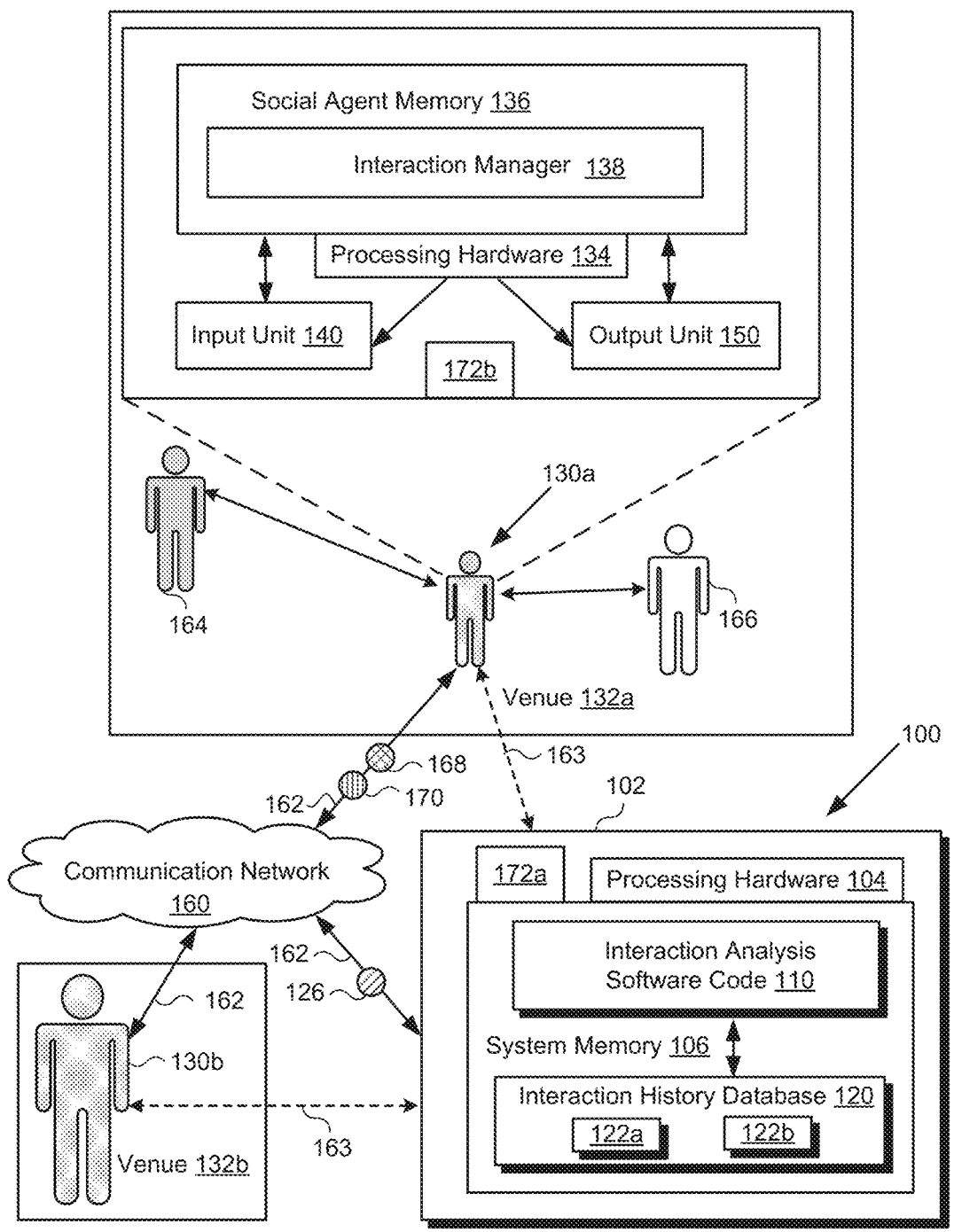
FIG. 1 shows an exemplary system for monitoring and improving the interaction quality of a social agent, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for automating social agent interaction quality monitoring and improvement that address and overcome the deficiencies in the conventional art. It is noted that, as used in the present application, the terms "automation," "automated", and "automating" refer to systems and processes that do not require the participation of a human administrator. Although in some implementations the interaction assessments and corrective strategies identified by the systems and methods disclosed herein may be reviewed or even modified by a human system administrator, that human involvement is optional. Thus, the methods described in the present application may be performed under the control of hardware processing components of the disclosed social agents.

It is further noted that, as defined in the present application, the term "interaction" may refer to language based communications in the form of speech or text, for example, and in some implementations may include non-verbal expressions. Moreover, the term "non-verbal expression" may refer to vocalizations that are not language based, i.e., non-verbal vocalizations, as well as to physical gestures and postures. Examples of non-verbal vocalizations may include a sigh, a murmur of agreement or disagreement, or a giggle, to name a few.

It is also noted that, as used in the present application, the term "social agent" refers to a non-human communicative entity rendered in hardware and software that is designed for expressive interaction with one or more human users. In some use cases, a social agent may be instantiated as a virtual character rendered on a display and appearing to watch and listen to a user in order to have a conversation with the user. In other use cases, a social agent may take the form of a machine, such as a robot for example, appearing to watch and listen to a user in order to converse with the user. Alternatively, a social agent may be implemented as an automated voice response (AVR) system, or an interactive voice response (IVR) system, for example.

FIG. 1 shows a diagram of system for automating social agent interaction quality monitoring and improvement 100 (hereinafter "system 100"), according to one exemplary implementation. As shown in FIG. 1, system 100 includes computing platform 102 having processing hardware 104, transceiver 172a, and system memory 106 implemented as a non-transitory storage medium. According to the present exemplary implementation, system memory 106 stores interaction analysis software code 110 and interaction history database 120 including interaction histories 122a and 122b.

As further shown in FIG. 1, system 100 is implemented within a use environment including communication network 160 providing network communication links 162, as well as one or more social agents 130a and 130b instantiated in the form of physical devices such as robots and communicatively coupled to system 100 via communication network 160 and network communication links 162, or, alternatively, by direct wireless communication links 163. Thus, in some implementations, system 100 may be remote from one or both of social agents 130a and 130b, while in other implementations system 100 may be situated sufficiently close to one or both of social agents 130a and 130b to enable communications with one or both of social agents 130a and 130b via direct wireless communication links 163 using one or more of multiple wireless communication methods. Examples of such wireless communication methods include WiFi. Bluetooth, ZigBee, and 60 GHz wireless communications methods, to name a few.

It is noted that although FIG. 1 depicts social agents 130a and 130b as being instantiated as robots, in other implementations, social agents 130a and 130b may be instantiated as tabletop devices, such as speakers, displays, or figurines, or as wall mounted speakers or displays, to name a few examples. As shown in FIG. 1, social agent 130a includes processing hardware 134, input unit 140, output unit 150, transceiver 172*b*, and social agent memory 136 implemented as a non-transitory storage medium. According to the present exemplary implementation, social agent memory 136 stores interaction manager 138.

It is noted that social agent 130*b* corresponds in general to social agent 130*a*. Thus, although not shown in FIG. 1, like social agent 130*a*, social agent 130*b* may include processing hardware 134, input unit 140, output unit 150, transceiver 172*b*, and social agent memory 136 storing interaction manager 138. It is further noted that although FIG. 1 depicts two social agents 130*a* and 130*b*, that representation is merely exemplary. In other implementations, system 100 may be communicatively coupled to one social agent, e.g., social agent 130*a*, or to more than two social agents.

In addition, FIG. 1 shows venue 132*a* and one or more users 164 and 166 interacting with social agent 130*a* in venue 132*a*. Also shown in FIG. 1 are interaction data 126 describing an interaction of social agent 130*a* with one or more of users 164 and 166, assessment 168 of the interaction as one of successful or including a flaw, and interaction strategy 170 for correcting the flaw if the flaw is present. FIG. 1 further shows venue 132*b* in which social agent 130*b* is situated. In some implementations, venues 132*a* and 132*b* may be different venues that are remote from one another, such as situated in different geographical locations or different structures such as different buildings or cruise ships, for example. In other implementations, venues 132*a* and 132*b* may be different venues situated in a common structure, such as the same building or cruise ship, for example. In yet other implementations, venues 132*a* and 132*b* may be the same venue. That is to say, in some implementations, social agents 130*a* and 130*b* may share a common venue.

In various implementations, venues 132*a* and 132*b* may be indoor venues or outdoor venues. Moreover, in various implementations, venues 132*a* and 132*b* may be small private venues, large group venues, or public venues. A small private indoor venue may be a private residence, a hotel room, or a cruise ship cabin for example, while a small private outdoor venue may be a private open air box at a baseball park, or an open private watercraft, for instance. Examples of a large group indoor venues may include theaters, concert halls, indoor arenas, airports or other transportation hubs, to name a few, while a large group outdoor venue may be an open air sports stadium, polo field or other equestrian event setting, or an open air shopping mall, again to name a few examples. Examples of indoor public venues may include a public auditorium or recreation center, while an example of an outdoor public venue may be a public park.

It is noted that although FIG. 1 shows two users 164 and 166 to be present in venue 132*a*, that representation is provided merely in the interests of conceptual clarity. More generally, fewer, or more than two users may be present in venue 132*a*. Moreover, in various implementations in which one or more of users 164 and 166 are present in venue 132*a*, social agent 130*a* may be configured to interact with users 164 and 166 individually, or may be configured to interact with some or all of users 164 and 166 in a group interaction, i.e., substantially concurrently.

It is noted that although FIG. 1 shows interaction history database 120 as storing two interaction histories 122*a* and 122*b*, that exemplary depiction is also provided merely in the interests of conceptual clarity. More generally, interaction history database 120 may store more than two interaction histories, such as hundreds, thousands, or millions of interaction histories, for example. Moreover, in various implementations, each of interaction histories 122*a* and 122*b* may be an interaction history dedicated to interactions of social agent 130*a* with a particular user, such as one of users 164 or 166, or to one or more distinct temporal sessions over which an interaction of social agent 130*a* with one or more of users 164 and 166 extends. That is to say, in some implementations, interaction histories 122*a* and 122*b* may each be personal to respective users 164 and 166, while in other implementations, each of interaction histories 122*a* and 122*b* may be dedicated to a particular temporal interaction session or series of temporal interaction sessions including social agent 130*a* and more than one of users 164 and 166.

Moreover, while in some implementations interaction histories 122*a* and 122*b* may be comprehensive with respect to a particular user or temporal interaction, in other implementations, interaction histories may retain only a predetermined number of the most recent interactions by a user, or a predetermined number of interactive exchanges or turns during an interaction. Thus, in some implementations, interaction history 122*a* may store only the most recent four, or any other predetermined number of interactive responses between social agent 130*a* and user 164, or the most recent four, or any other predetermined number of interactive responses by any or all participants in a group interaction session.

Although the present application refers to interaction analysis software code 110 and interaction history database 120 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs. RAM, programmable read-only memory (PROM), erasable PROM (EPROM), and FLASH memory.

It is further noted that although FIG. 1 depicts interaction analysis software code 110 and interaction history database 120 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100, while interaction analysis software code 110 and interaction history database 120 may be stored remotely from one another in the distributed memory resources of system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as interaction analysis software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

It is noted that, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network." in the context of deep learning, may refer to an NN that utilizes multiple hidden layers between input and output layers, which may allow for learning based on features not explicitly defined in raw data.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines. Moreover, in some implementations, communication network 120 may be a high-speed network suitable for high performance computing (HPC), for example a 10 GigE network or an Infiniband network.

Transceivers 172a and 172b may be implemented as wireless communication units enabling system 100 to communicate with social agent 130a, via communication network 160 and network communication links 162, or via direct wireless communication link 163. For example, transceivers 172a and 172b may be implemented as fourth generation (4G) wireless transceivers, or as 5G wireless transceivers. In addition, or alternatively, transceivers 172a and 172b may be configured for communications using one or more of WiFi. Bluetooth. ZigBee, and 60 GHz wireless communications methods.

Figure 2A:
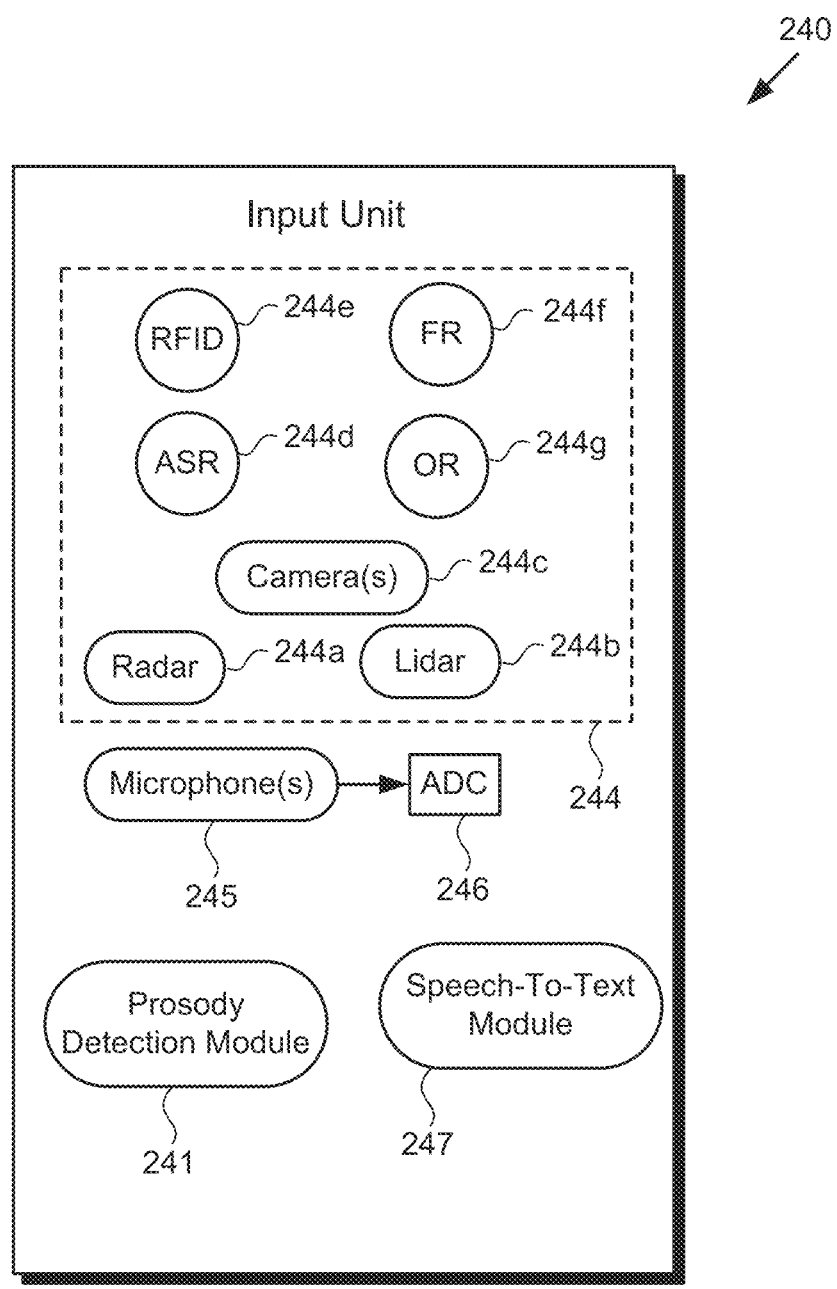
FIG. 2A shows a more detailed diagram of an input unit suitable for use as a component of a social agent, according to one implementation

FIG. 2A shows a more detailed diagram of input unit 240 suitable for use as a component of each of social agents 130a and 130b, in FIG. 1, according to one implementation. As shown in FIG. 2A, input unit 240 may include prosody detection module 241, multiple sensors 244, one or more microphones 245 (hereinafter "microphone(s) 245"), analog-to-digital converter (ADC) 246, and Speech-To-Text (STT) module 247. It is noted that the term "prosody" has its customary meaning in the art. That is to say, prosody refers to the patterns of stress and intonation in speech, and may include loudness, pitch, timbre, cadence, the speed with which the speech is delivered, and the like.

As further shown in FIG. 2A, sensors 244 of input unit 240 may include one or more of radio detection and ranging (radar) detector 244a, laser imaging, detection, and ranging (lidar) detector 244b, one or more cameras 244c (hereinafter "camera(s) 244c"), automatic speech recognition (ASR) sensor 244d, radio-frequency identification (RFID) sensor 244e, facial recognition (FR) sensor 244f, and object recognition (OR) sensor 244g. Input unit 240 corresponds in general to input unit 140, in FIG. 1. Thus, input unit 140 may share any of the characteristics attributed to input unit 240 by the present disclosure, and vice versa.

It is noted that the specific features shown to be included in input unit 140/240 are merely exemplary, and in other implementations, input unit 140/240 may include more, or fewer, features than prosody detection module 241, sensors 244, microphone(s) 245, ADC 246, and STT module 247. Moreover, in other implementations, input unit 140/240 may include a feature or features other than one or more of prosody detection module 241, sensors 244, microphone(s) 245, ADC 246, and STT module 247.

It is also noted that the specific sensors shown to be included among sensors 244 of input unit 140/240 are merely exemplary, and in other implementations, sensors 244 of input unit 140/240 may include more, or fewer, sensors than radar detector 244a, lidar detector 244b, camera(s) 244c. ASR sensor 244d. RFID sensor 244e. FR sensor 244f, and OR sensor 244g. For example, in implementations in which the anonymity of one or more users 164 and 166 is a priority, input unit 140/240 may include prosody detection module 241, microphone(s) 245 and radar detector 244a or lidar detector 244b, as well as in some instances RFID sensor 244e, but may omit camera(s) 244c, ASR sensor 244d, FR sensor 244f, and OR sensor 244g. In other implementation, input unit 140/240 may include microphone(s) 245, radar detector 244a, and camera(s) 244c but may omit lidar detector 244b, ASR sensor 244d, RFID sensor 244e. FR sensor 244f, and OR sensor 244g. Moreover, in some implementations, sensors 244 may include a sensor or sensors other than one or more of radar detector 244a, lidar detector 244b, camera(s) 244c, ASR sensor 244d, RFID sensor 244e. FR sensor 244f, and OR sensor 244g. It is further noted that, when included among sensors 244 of input unit 140/240, camera(s) 244c may include various types of cameras, such as red-green-blue (RGB) still image and video cameras. RGB-D cameras including a depth sensor, and infrared (IR) cameras, for example.

Figure 2B:
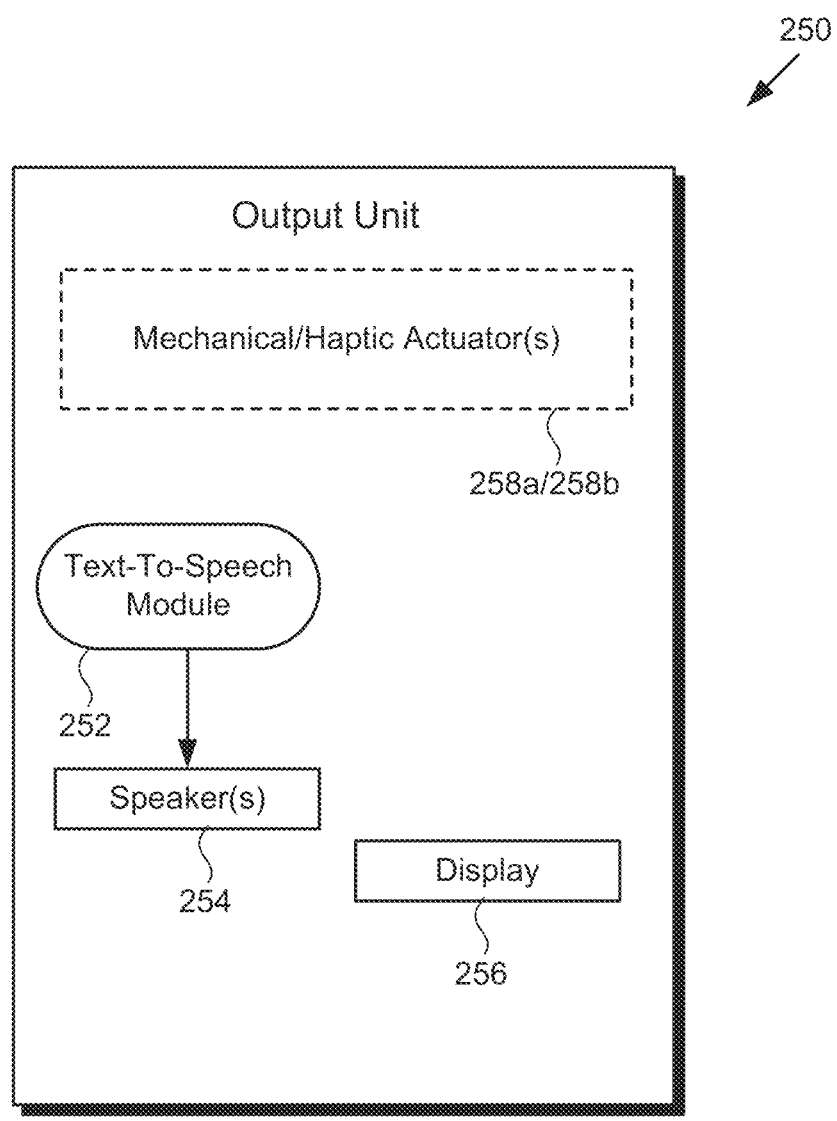
FIG. 2B shows a more detailed diagram of an output unit suitable for use as a component of a social agent, according to one implementation

FIG. 2B shows a more detailed diagram of output unit 250 suitable for use as a component of each of social agents 130a and 130b, in FIG. 1, according to one implementation. As shown in FIG. 2B, output unit 250 may include one or more of Text-To-Speech (TTS) module 252 in combination with one or more audio speakers 254 (hereinafter "speaker(s) 254"), and display 256.

As further shown in FIG. 2B, in some implementations, output unit 250 may include one or more mechanical actuators 258a (hereinafter "mechanical actuator(s) 258a"), one or more haptic actuators 258b (hereinafter "haptic actuators) 258b"), or a combination of mechanical actuator(s) 258a and haptic actuators(s) 258b. It is also noted that, when included as a component or components of output unit 250, mechanical actuator(s) 258a may be used to produce facial expressions by social agents 130a and 130b, and/or to articulate one or more limbs or joints of social agents 130a and 130b. Output unit 250 corresponds in general to output unit 150, in FIG. 1. Thus, output unit 150 may share any of the characteristics attributed to input unit 250 by the present disclosure, and vice versa.

The specific features shown to be included in output unit 150/250 are merely exemplary, and in other implementations, output unit 150/250 may include more, or fewer, features than TTS module 252, speaker(s) 254, display 256, mechanical actuator(s) 258a, and haptic actuator(s) 258b. Moreover, in other implementations, output unit 150/250 may include a feature or features other than one or more of TTS module 252, speaker(s) 254, display 256, mechanical actuator(s) 258a, and haptic actuator(s) 258b. It is further noted that display 256 of output unit 150/250 may be implemented as a liquid crystal display (LCD), light-emitting diode (LED) display, organic light-emitting diode (OLED) display, quantum dot (QD) display, or any other suitable display screen that perform a physical transformation of signals to light.

Figure 3:
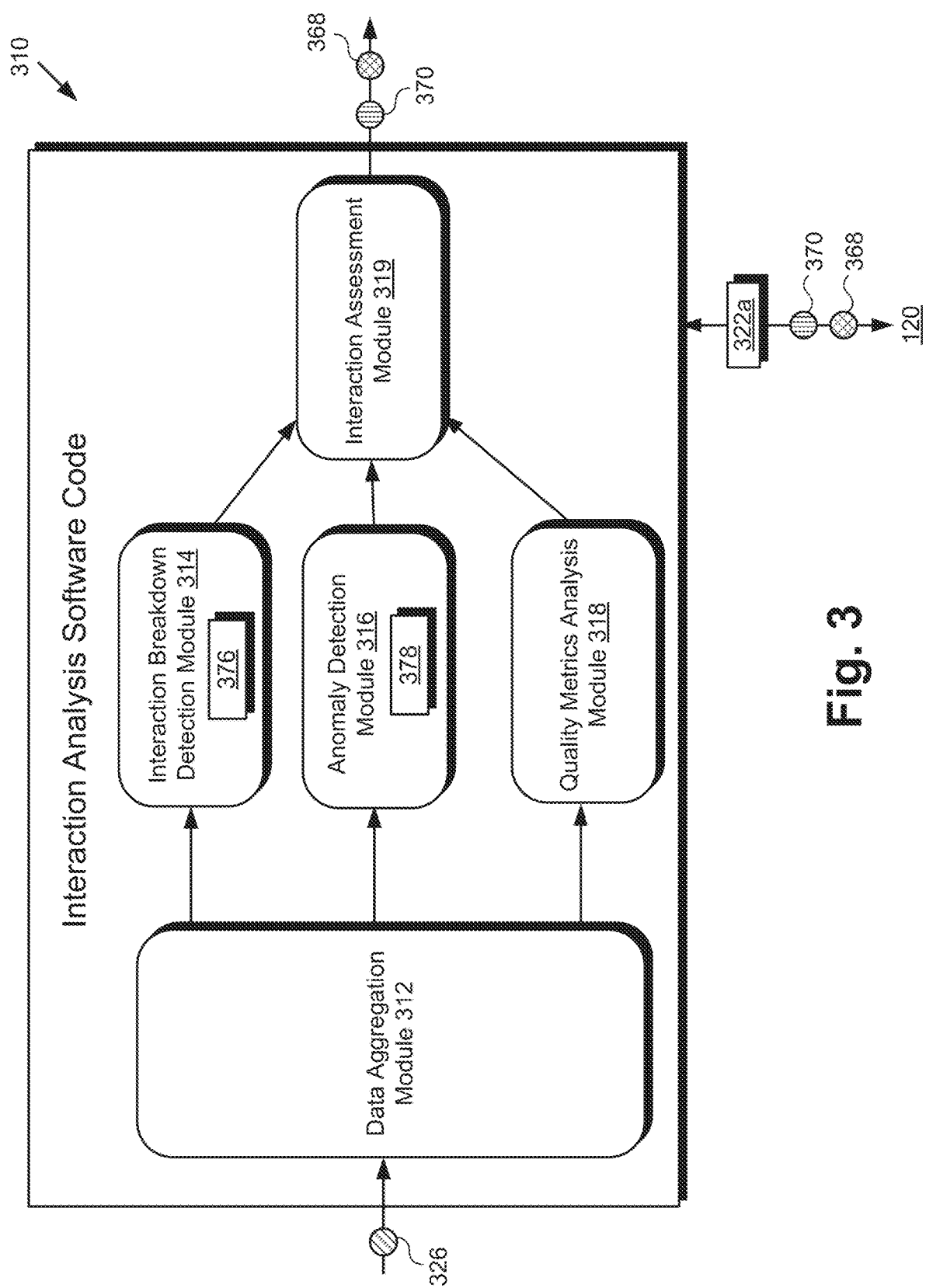
FIG. 3 shows an exemplary software code suitable for execution by a processing hardware of the system of FIG. 1, according to one implementation.

FIG. 3 shows exemplary interaction analysis software code 310 suitable for execution by processing hardware 104 of system 100, in FIG. 1, according to one implementation. As shown in FIG. 3, interaction analysis software code 310 may include data aggregation module 312, and interaction breakdown detection module 314, which may include one or more trained machine learning models 376 (hereinafter "ML model(s) 376"), such as trained neural networks (NNs), for example. As further shown in FIG. 3, interaction analysis software code 310 may also include anomaly detection module 316, which may include one or more trained machine learning models 378 (hereinafter "ML model(s) 378"), such as trained NNs, for example, as well as quality metrics analysis module 318, and interaction assessment module 319. As shown in FIG. 3, interaction analysis software code 310 is configured to be communicatively coupled to interaction history database 120, in FIG. 1. Also shown in FIG. 3 are interaction data 326 received as an input by data aggregation module 312 of interaction analysis software code 310, interaction history 322a, and assessment 368 and interaction strategy 370, one or both of which may be provided as an output by interaction assessment module 319.

Interaction analysis software code 310, in FIG. 3, corresponds in general to interaction analysis software code 110, in FIG. 1, and those corresponding features may share any of the characteristics attributed to either corresponding feature by the present disclosure. That is to say, like interaction analysis software code 310, interaction analysis software code 110 may include features corresponding respectively to data aggregation module 312, interaction breakdown detection module 314, anomaly detection module 316, quality metrics analysis module 318, and interaction assessment module 319. In addition, interaction data 326, interaction history 322a, assessment 368, and interaction strategy 370 correspond respectively in general to interaction data 126, interaction history 122a, assessment 168, and interaction strategy 170, in FIG. 1. Thus, interaction data 326, interaction history 322a, assessment 368, and interaction strategy 370 may share any of the characteristics attributed to respective interaction data 126, interaction history 122a, assessment 168, and interaction strategy 170 by the present disclosure, and vice versa.

Figure 4:
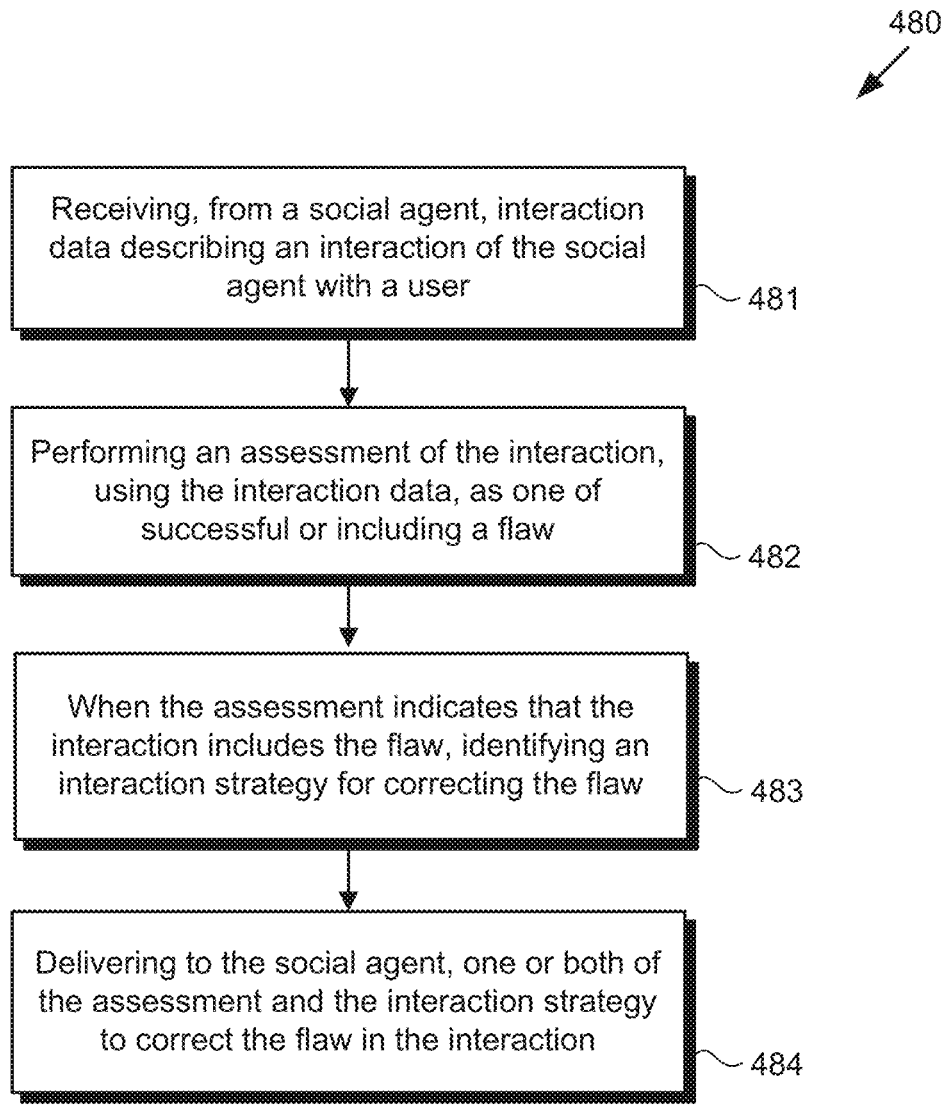
FIG. 4 shows a flowchart presenting an exemplary method for use by a system for monitoring and improving the interaction quality of a social agent, according to one implementation.

The functionality of interaction analysis software code 110/310 will be further described by reference to FIG. 4. FIG. 4 shows flowchart 480 presenting an exemplary method for use by a system for monitoring and improving the interaction quality of a social agent, according to one implementation. With respect to the method outlined in FIG. 4, it is noted that certain details and features have been left out of flowchart 480 in order not to obscure the discussion of the inventive features in the present application.

Referring to FIG. 4, with further reference to FIGS. 1, 2A and 3, flowchart 480 may begin with receiving, from social agent 130a, interaction data 126/326 describing an interaction of social agent 130a with a user, i.e., at least one of users 164 or 166 (action 481). Interaction data 126/326 may include data obtained by any one or more of sensors 244 and microphone(s) 245 of input unit 140/240, for example. Moreover, in some implementations, interaction data 126/326 may include data obtained by a feature of input unit 140/240 after processing by a feature of output unit 150/250. For example, where the interaction of social agent 130a with the user includes a dialogue between social agent 130a and the user, interaction data 126/326 may include one or more of audio obtained by microphone(s) 245, or prosody data and speech-to-text data provided by respective prosody detection module 241 and STT module 247 of input unit 140/240. Alternatively, or in addition, interaction data 126/326 may include radar data obtained by radar detector 244a of input unit 140/240. As yet another alternative, or in addition, interaction data 126/326 may include video obtained by camera(s) 244c of input unit 140/240.

Interaction data 126/326 may be received from social agent 130a in action 481 by interaction analysis software code 110/310, executed by processing hardware 104, and using data aggregation module 312. Interaction data 126/326 may be received by system 100 via communication network 160 and network communication links 162, or via direct wireless communication link 163. Interaction data 126/326 may be timestamped at any desired level of granularity, such as down to and including at the word level when interaction data includes audio or speech-to-text data. Such timestamping may be performed by social agent processing hardware 134, or using data aggregation module 312 of interaction analysis software code 110/310 upon substantially continuous receipt of interaction data 126/326 from social agent 130a. Thus, in some implementations, input data 126/326 is time aligned with the interaction of social agent 130a with the user.

As noted above, prosody refers to the patterns of stress and intonation in speech. Thus prosody data included in interaction data 126/326 may describe the loudness, pitch, timbre, cadence, the speed with which the speech is delivered, and the like, of speech by the user when interacting with social agent 130a. It is noted that in implementations in which interaction data 126/326 includes audio but omits prosody data and speech-to-text data, data aggregation module 312 may be configured to generate the prosody data and speech-to-text data using the audio data included in interaction data 126/326. Moreover, in various implementations, data aggregation module 312 may be configured to process interaction data 126/326 substantially continuously as it is received, or in discrete timestamped data packets every predetermined or dynamically determined time interval.

In implementations in which interaction data 126/326 includes audio data or prosody data and text-to-speech data, input data 126/326 may further include microphone metadata generated by one or more meta-sensors of microphone(s) 245. That metadata may describe the angle of arrival of sound at microphone(s) 245, as well as the presence of background noise, such as crowd noise, background conversations, or audio output from a television, radio, or other device within venue 132a.

In implementations in which interaction data 126/326 includes radar data, that radar data may distinguish between users present in venue 132a and hard objects, such as furniture for example, situated in venue 132a. Moreover, that radar data may enable identification of the number of users present in venue 132a, their respective locations relative to social agent 130a, and in some implementations, physical manifestations by the users, such as gestures, posture, and head position. Moreover, in implementations in which interaction data 126/326 includes video, such video may enable identification of even more subtle physical manifestations such as eye gaze and facial expressions of the user or users, in addition to their number, relative locations, gestures, postures, and head positions.

Flowchart 480 further includes performing assessment 168/368 of the interaction of social agent 130a with the user, using interaction data 126/326, as one of successful or including a flaw (action 482). Action 482 may be performed by interaction analysis software code 110/310, executed by processing hardware 104, and using interaction assessment module 319 and outputs provided by one or more of interaction breakdown detection module 314, anomaly detection module 316, and quality metrics analysis module 318. For example, interaction breakdown detection module 314 may use ML model(s) 376 to predict the next interactive expression by the user, e.g., a word or phrase, to be used by the user in interacting with social agent 130a. That predicted next expression may be compared to the actual expression used by the user and included in interaction data 126/326. Based on the results of that comparison and a similarity criterion that may be predetermined or may be dynamically determined by interaction breakdown detection module 314, interaction breakdown detection module 314 may determine that an interaction breakdown has or has not occurred.

In use cases in which the similarity criterion is determined dynamically by interaction breakdown detection module 314, that similarity criterion may be determined based on an interaction history stored in interaction history database 120. For example, where the interaction by social agent 130a is an interaction with user 164 having interaction history 122a/322a, interaction breakdown detection module 314 may determine the similarity criterion for use in determining whether an interaction breakdown has occurred based on comparisons of predicted and actual expressions by user 164 during previous successful interactions. Alternatively, where the interaction of social agent 130a is with multiple users concurrently, such as users 164 and 166, the predetermined similarity criterion may be relaxed, or the dynamically determined similarity criterion may be determined at least in part, on how many users participate in the interaction Alternatively, or in addition, interaction breakdown detection module 314 may be configured to project each interactive expression by the user, or a predetermined subset of the most recent interactive expressions by the user, onto a multi-dimensional embedding space, and to analyze the resulting trajectory to determine whether the interaction is deviating from a logical interaction path in the embedding space, based conversation logic. A deviation criterion for making such a determination may be predetermined or determined dynamically based on an interaction history, the number of users participating in the interaction with social agent 130a, or both, as described above. It is noted that interaction breakdown detection module 314 may also be configured to employ conversation logic to recognize topic changes in a dialogue between social agent 130a and one or more of users 164 and 166. Such configuration of interaction breakdown detection module 314 advantageously prevents interaction breakdown detection module 314 from misinterpreting a change in subject matter during a successful interaction as a dialogue breakdown.

Anomaly detection module 316 may use ML model(s) 378 to predict the next non-verbal vocalization, gesture, pose, facial expression or other physical manifestation by the user during the interaction with social agent 130a. That predicted next non-verbal vocalization or physical manifestation may be compared to the actual expression used by the user and included in interaction data 126/326. Based on the results of that comparison and a comparative threshold that may be predetermined or may be dynamically determined by anomaly detection module 316, anomaly detection module 316 may determine that an interaction anomaly has or has not occurred.

In use cases in which the comparative threshold is determined dynamically by anomaly detection module 316, that comparative threshold may be determined based on an interaction history stored in interaction history database 120. For example, where the interaction by social agent 130a is an interaction with user 164 having interaction history 122a/322a, anomaly detection module 316 may determine the comparative threshold for use in determining whether an interaction anomaly has occurred based on comparisons of predicted and actual expressions by user 164 during previous successful interactions. Thus, in some implementations, processing hardware 104 executes interaction analysis software code 110/310 to perform assessment 168/368 based on one or more of an eye gaze, a facial expression, or a gesture by the user. Moreover, where the interaction of social agent 130a is with multiple users concurrently, such as users 164 and 166, the predetermined comparative threshold may be relaxed, or the dynamically determined comparative threshold may be determined at least in part, on how many users participate in the interaction.

Thus, in various use cases, a flaw in an interaction of social agent 130a with the user may include one or more of an interaction breakdown or an anomalous response by the user. Furthermore, in use cases in which the user is one of multiple users participating in the interaction with social agent 138a, whether the assessment 168/368 indicates that the interaction is flawed may depend at least in part on how many users participate in the interaction.

Quality metrics analysis module 318 may extract one or more interaction quality metrics from interaction data 126/326, and may employ one or more known statistical techniques to analyze each metric. In the exemplary case of speech interaction, examples of such metrics may include word overlap, language alignment, and sentence or phrase length, to name a few. Each quality metric extracted from interaction data 126/326 may be compared to a predetermined or dynamically determined expectation value for that metric, and deviations from that expectation value that exceed a predetermined threshold may flagged and output by quality metrics analysis module 318 as indicative of a flawed interaction of social agent 130a with the user.

In use cases in which the expectation value for a metric is determined dynamically by quality metrics analysis module 318, that expectation value may be determined based on an interaction history stored in interaction history database 120. For example, where the interaction by social agent 130a is an interaction with user 164 having interaction history 122a/322a, quality metric analysis module 318 may determine the expectation value for a particular metric based on values of that metric during previous successful interactions.

It is noted that the data describing previous interactions and retained in interaction history database 120 is exclusive of personally identifiable information (PII) of users with whom social agents 130a and 130b have interacted. Thus, although social agents 130a and 130b are typically able to distinguish an anonymous user with whom a previous interaction has occurred from anonymous users having no previous interaction experience with social agent 130a or social agent 130b, interaction history database 120 does not retain information describing the age, gender, race, ethnicity, or any other PII of any user with whom social agent 130a or social agent 130b converses or otherwise interacts.

Flowchart 480 further includes, when assessment 168/368 indicates that the interaction includes the flaw, identifying interaction strategy 170/370 for correcting the flaw (action 483). Identification of interaction strategy 170/370 in action 483 may be performed by interaction analysis software code 110/310, executed by processing hardware 104 of computing platform 102, and using interaction assessment module 319. In some use cases in which interaction data 126/326 indicates that the flaw identified by assessment 168/368 was caused by the most recent statement or question by social agent 130a, for instance, interaction strategy 170/370 may include a predetermined question for use by social agent 130a to obtain additional information from the user. For example, interaction strategy 170/370 may include asking "Did I say something wrong?" or "Is that the response you wanted from me?" Alternatively, or in addition, in some use cases, interaction strategy 170/370 may include a predetermined phrase or question designed to redirect the interaction with the user. For example, interaction strategy 170/370 may include asking "Would you like to talk about something else?"

However, in some implementations, interaction strategy 170/370 may be identified based specifically on what type of flaw has been detected by assessment 168/368, i.e., whether the flaw is based on an interaction breakdown, an interaction anomaly, a deviant quality metric, or any combination thereof. As a specific example, where the flaw is determined to be an interaction breakdown because a projection of the interaction onto a multi-dimensional embedding space results in a trajectory that has begun to stray from a logical interaction path as determined based on conversation logic, processing hardware 104 may execute interaction analysis software code to identify an interactive expression designed to realign the trajectory with a more logical path. In that case, interaction strategy 170/370 may include the identified corrective interactive expression.

Alternatively, interaction strategy may be identified based on an interaction history stored in interaction history database 120. For example, where the flaw is identified based on detection of a specific type of interaction breakdown or anomaly, processing hardware 104 may execute interaction analysis software code 110/310 to search interaction history database 120 for previous interactions that included analogous flaws that were resolved. In that case, one or more of the solutions to those analogous flaws may be identified as interaction strategy 170/370.

As another alternative, where the interaction by social agent 130a is an interaction with user 164 having interaction history 122a/322a, interaction assessment module 319 may identify interaction strategy 170/370 based on the correction of flaws during previous successful interactions with user 164. In that case, one or more of those previous corrections may be identified as interaction strategy 170/370. As yet another alternative, in some implementations, processing hardware 104 may execute interaction analysis software code 110/310 to identify interaction strategy 170/370 by flagging the flaw detected by the assessment for review by a human system administrator, and receiving interaction strategy 170/370 as a corrective input to system 100 by the human system administrator.

Flowchart 480 may continue and conclude with delivering, to social agent 130a, at least one of assessment 168/368 or interaction strategy 170/370 to correct the flaw in the interaction (action 484). In use cases where assessment 168/368 performed in action 482 identifies the interaction of social agent 130a with the user as successful, assessment 168/368 may be delivered to social agent 130a as positive feedback to interaction manager 138. However, where assessment 168/368 identifies the interaction as including a flaw, interaction strategy 170/370, or interaction strategy 170/370 and assessment 168/368 may be delivered to social agent 130a for use by interaction manager 138 of social agent 130a to correct the flaw.

Action 484 may be performed by interaction analysis software code 110/310, executed by processing hardware 104 of computing platform 102, via communication network 160 and network communication links 162, or via direct wireless communication link 163. Moreover, in some implementations, action 484 may be performed during the interaction of social agent 130a with the user so as to provide the positive feedback or corrective interaction strategy 170/370 in real-time with respect to the interaction of social agent 130a with the user.

In some implementations in which system 100 is communicatively coupled to multiple social agents, e.g., social agent 130b as well as social agent 130a, processing hardware 104 may execute interaction analysis software code 110/310 to deliver one or both of assessment 168/368 and interaction strategy 170/370 to one or more others of the multiple social agents, e.g., social agent 130b. In addition, and as shown in FIG. 3, in some implementations, processing hardware 104 may execute interaction analysis software code 110/310 to store one or both of assessment 168/368 and interaction strategy 170/370 to interaction history database 120. With respect to the method outlined by flowchart 480, it is emphasized that, in some implementations, actions 481 through 484 may be performed in an automated process from which human involvement may be omitted.

Thus, the present application discloses systems and methods for automating social agent interaction quality monitoring and improvement that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for monitoring and improving a social agent interaction quality, the system comprising:
   a computing platform including processing hardware and a system memory;
   a software code stored in the system memory;
   the processing hardware configured to execute the software code to:
   receive, from a social agent, an interaction data describing an interaction of the social agent with a user;
   perform an assessment of the interaction, using the interaction data, to determine whether the interaction includes a flaw based on a comparison of a predicted interactive expression by the user to an actual expression used by the user and included in the interaction data;

when the assessment indicates that the interaction includes the flaw, identify an interaction strategy for correcting the flaw; and deliver, to the social agent, at least one of the assessment or the interaction strategy to correct the flaw in the interaction.

2. The system of claim 1, wherein the interaction data comprises at least one of audio or a combination of prosody data and speech-to-text data.

3. The system of claim 1, wherein the interaction data comprises at least one of radar data or video.

4. The system of claim 1, wherein to identify the interaction strategy for correcting the flaw, the processing hardware is further configured to execute the software code to:

flag the flaw for review by a human system administrator; and receive the interaction strategy as a corrective input to the system by the human system administrator.

5. The system of claim 1, wherein the processing hardware is further configured to execute the software code to perform the assessment based on at least one of an eye gaze, a facial expression, or a gesture by the user.

6. The system of claim 1, wherein the flaw comprises at least one of an interaction breakdown or an anomalous response by the user.

7. The system of claim 6, wherein the user is one of a plurality of users participating in the interaction with the social agent, and wherein whether the assessment indicates the flaw depends at least in part on how many users participate in the interaction.

8. The system of claim 1, wherein the processing hardware is further configured to execute the software code to deliver the at least one of the assessment or the interaction strategy to the social agent during the interaction of the social agent with the user.

9. The system of claim 1, wherein the social agent is one of a plurality of social agents, and wherein the processing hardware is further configured to execute the software code to deliver the at least one of the assessment or the interaction strategy to one or more others of the plurality of social agents.

10. The system of claim 1, wherein the interaction of the social agent with the user extends over a plurality of distinct temporal sessions.

11. A method for use by a system for monitoring and improving a social agent interaction quality, the system including a computing platform having processing hardware and a system memory storing a software code, the method comprising:

receiving from a social agent, by the software code executed by the processing hardware, an interaction data describing an interaction of the social agent with a user;

performing an assessment of the interaction, by the software code executed by the processing hardware and using the interaction data, to determine whether the interaction includes a flaw based on a comparison of a predicted interactive expression by the user to an actual expression used by the user and included in the interaction data;

when the assessment indicates that the interaction includes the flaw, identifying, by the software code executed by the processing hardware, an interaction strategy for correcting the flaw;

and delivering to the social agent, by the software code executed by the processing hardware, at least one of the assessment or the interaction strategy to correct the flaw in the interaction.

12. The method of claim 11, wherein the interaction data comprises at least one of audio or a combination of prosody data and speech-to-text data.

13. The method of claim 11, wherein the interaction data comprises at least one of radar data or video.

14. The method of claim 11, wherein identifying the interaction strategy for correcting the flaw further comprises:

flagging the flaw, by the software code executed by the processing hardware, for review by a human system administrator; and receiving, by the software code executed by the processing hardware, the interaction strategy as a corrective input to the system by the human system administrator.

15. The method of claim 11, wherein the assessment is performed based on at least one of an eye gaze, a facial expression, or a gesture by the user.

16. The method of claim 11, wherein the flaw comprises at least one of an interaction breakdown or an anomalous response by the user.

17. The method of claim 16, wherein the user is one of a plurality of users participating in the interaction with the social agent, and wherein whether the interaction includes the flaw depends at least in part on how many users participate in the interaction.

18. The method of claim 11, further comprising delivering the at least one of the assessment or the interaction strategy to the social agent during the interaction of the social agent with the user.

19. The method of claim 11, wherein the social agent is one of a plurality of social agents, the method further comprising delivering the at least one of the assessment or the interaction strategy to one or more others of the plurality of social agents.

20. The method of claim 11, wherein the interaction of the social agent with the user extends over a plurality of distinct temporal sessions.

* * * * *